Figure 1:
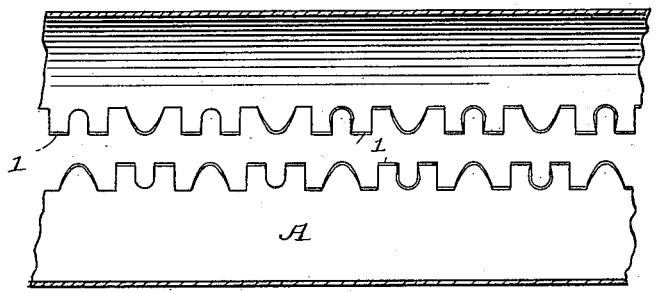

No. 621,729. Patented Mar. 21, 1899.
F. A. WILMOT.
SHEET METAL TUBE.
(Application filed Mar. 17, 1897.)
(No Model.)

WITNESSES
H. A. Lawly
S. C. Heley

INVENTOR
Frank A. Wilmot
By A. M. Wooster
Atty.

UNITED STATES PATENT OFFICE.

FRANK A. WILMOT, OF BRIDGEPORT, CONNECTICUT, ASSIGNOR TO THE WILMOT & HOBBS MANUFACTURING COMPANY, OF SAME PLACE.

SHEET-METAL TUBE.

SPECIFICATION forming part of Letters Patent No. 621,729, dated March 21, 1899.

Application filed March 17, 1897. Serial No. 627,994. (No model.)

*To all whom it may concern:*

Be it known that I, FRANK A. WILMOT, a citizen of the United States, residing at Bridgeport, in the county of Fairfield and State of Connecticut, have invented certain new and useful Improvements in Sheet-Metal Tubes; and I do hereby declare the following to be a full, clear, and exact description of the invention, such as will enable others skilled in the art to which it appertains to make and use the same.

My invention relates to the class of metal tubes which are formed from blanks of sheet metal having their edges secured together, and has for its object to provide a tube formed from a blank one or both of whose edges are so beveled that when they are brought together the outer surfaces of the edges will come in contact so as to form a joint which will be practically invisible upon the outer side, and may also, if preferred, be so beveled as to leave V-shaped or substantially V-shaped openings, which may or may not be continuous on the inner side of the tube. These openings when used serve as funnels to receive solder from the inner side when the joint is brazed or soldered to secure the edges, it being understood, of course, that the edges of blanks for making sheet-metal tubes as ordinarily prepared lie parallel or substantially parallel with each other, so that when the blank is bent to shape to form a tube there will necessarily be more or less of a V-shaped opening upon the outer side of the tube, it being therefore practically impossible to close the edges of the blank together closely enough to prevent the line of the joint being clearly visible on the outer side of the tube and rendering it necessary to fill the joint with solder from the outer side. By beveling the edges, however, on one or both sides, so that the side of the blank which is to form the outer side of the tube will be wider than the side of the blank which is to form the inner side of the tube, I am enabled to insure that when the blank is bent to tubular form the outer surfaces of the edges will come in contact, it being of course merely a matter of detail to so bevel the edges that the entire edges will lie in contact or to so bevel them that the outer surfaces only of the edges will lie in contact, thereby forming V-shaped or approximately V-shaped recesses on the inner side of the tube.

With these ends in view I have devised the novel tube of which the following description, in connection with the accompanying drawings, is a specification, reference characters being used to designate the several parts.

Figure 2:
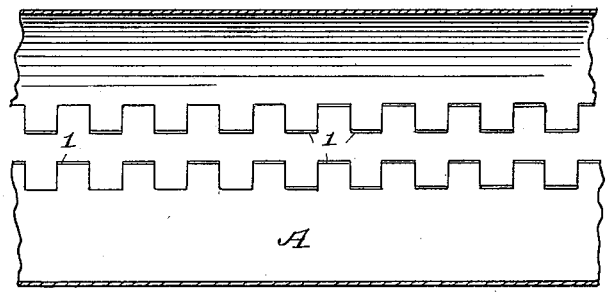
Figure 3:
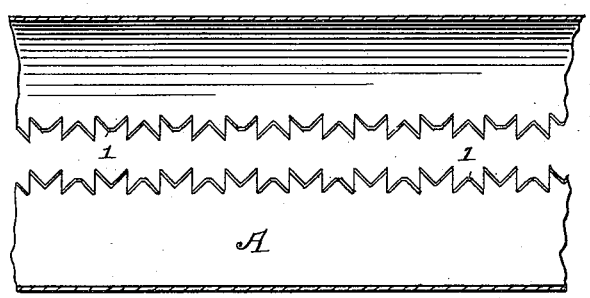

Figures 1, 2, and 3 are longitudinal sections of the tube, showing the inner side thereof, the edges being provided with different styles of interlocking projections and recesses and being beveled, so that when the edges are brought together the outer surfaces of the edges will lie closely in contact, making a joint practically invisible upon the outer side, and there will be more or less clearly-defined V-shaped openings on the inner side of the tube.

A denotes the tube the edges of which are beveled upon the inner side, as at 1. These bevels may be formed upon both edges or upon one edge only, as preferred. In Fig. 3 I have shown both edges of the tube as beveled alike. In Figs. 1 and 2 I have shown at the right the tips of all projections and the bases of all recesses also as beveled, and at the left in both figures I have shown the tips of all projections as beveled, but the bases of the recesses as not beveled. The bevels upon the edges of the blanks may be formed in any ordinary or preferred manner, that not being of the essence of my invention.

In forming my novel tubes the edges of the blank are brought together in any ordinary or preferred manner. The projections are caused to pass into the recesses, and circumferential compression is given to close the edges firmly together. After the edges have been brought together solder (not shown) may or may not be placed in the inner side of the tube, which is heated, and the solder is allowed to run along the joint and fill the joint and the recesses between the bevels, if there are any. The walls of the recesses will retain the solder in the several V-shaped openings and will prevent it from flowing endwise in the joint.

It is to be understood that in practice it is not necessary that the beveling of the edges shall be such as to leave a V-shaped opening along the completed tube of the width indicated in the figures. Such opening may be so narrow as not to be readily perceived; but in order to insure the formation of a joint which will be practically invisible upon the outer side it is essential that the beveling shall be such as to insure the firm meeting of the outer surfaces of the edges with a less firm meeting of the surfaces back of that point. To secure this, the beveling must be such as to result in the actual contact of the outer surfaces of the edges, while leaving a space of more or less width between the inner surfaces of the edges, which space may or may not be perceptibly V-shaped and which space may, if desired, be employed for the reception of solder.

Having thus described my invention, I claim—

A tube formed from a blank whose edges are provided with interlocking projections and recesses, one of said edges being beveled on the side which is to form the inner side of the tube so that when bent to tubular form the outer surfaces of the edges will come in contact leaving V-shaped openings on the inner side of the joint which receive solder, the walls of the recesses preventing the solder from flowing endwise in the joint.

In testimony whereof I affix my signature in presence of two witnesses.

FRANK A. WILMOT.

Witnesses:
A. M. WOOSTER,
SUSAN V. HELEY.